United States Patent
Bauer et al.

(10) Patent No.: US 6,822,067 B2
(45) Date of Patent: Nov. 23, 2004

(54) QUICK-SETTING MIXTURES AND KITS WITH POLYFUNCTIONAL CYANATES AND AMINES, THE THERMOSETS PRODUCED THEREFROM AND METHODS FOR THE PRODUCTION THEREOF

(75) Inventors: Jörg Bauer, Senzig (DE); Monika Bauer, Senzig (DE); Christoph Uhlig, Berlin (DE)

(73) Assignee: Fraunhofer-Gesellschaft zur Forderung der Angewandten Forschung E. V. (DE)

( * ) Notice: Subject to any disclaimer, the term of this patent is extended or adjusted under 35 U.S.C. 154(b) by 51 days.

(21) Appl. No.: 10/221,484
(22) PCT Filed: Mar. 8, 2001
(86) PCT No.: PCT/EP01/02622
  § 371 (c)(1),
  (2), (4) Date: Nov. 8, 2002
(87) PCT Pub. No.: WO01/68741
  PCT Pub. Date: Sep. 20, 2001

(65) Prior Publication Data
  US 2003/0176616 A1 Sep. 18, 2003

(30) Foreign Application Priority Data
  Mar. 14, 2000 (DE) .......................... 100 12 359

(51) Int. Cl.[7] .............................................. C08G 59/00
(52) U.S. Cl. ........................................ 528/407; 528/422
(58) Field of Search ................................ 528/407, 422

(56) References Cited

U.S. PATENT DOCUMENTS

| 3,108,029 A | 10/1963 | Wohnsiedler et al. |
| 4,369,302 A | 1/1983 | Ikeguchi et al. |
| 4,370,467 A | 1/1983 | Gaku et al. |
| 4,393,195 A | 7/1983 | Gaku et al. |
| 4,410,666 A | 10/1983 | Ikeguchi et al. |
| 4,469,859 A | 9/1984 | Gaku et al. |
| 4,499,245 A | 2/1985 | Ikeguchi et al. |
| 4,506,053 A | 3/1985 | Sakurai et al. |
| 5,855,821 A | 1/1999 | Chau et al. |

FOREIGN PATENT DOCUMENTS

| DE | 1220132 | 6/1966 |
| DE | 19528882 A1 | 2/1997 |
| EP | 0369527 | 5/1990 |
| GB | 1055524 | 1/1967 |

OTHER PUBLICATIONS

Von E. Grigat et al., Neuere Methoden der präparativen organischen Chemie VI (Synthese und Reaktionen der Cyansäureester), Angrew. Chem., 79 Jahrg 1967. Nr. 5. pp. 219–231.

I. Hamerton, "Chemistry and technology of cyanate ester resins," 1994, 6 pages.

*Primary Examiner*—Rachel Gorr
(74) *Attorney, Agent, or Firm*—Hunton & Williams LLP

(57) ABSTRACT

The invention describes a fast curable system for the preparation of amine modified thermosettings containing triazine groups, the system comprising at least one polyfuctional organic monomeric or prepolymerized cyanate and at least one primary or secondary amine, wherein the amount of amine is selected such that the molar ratio of cyanate radicals to amine radicals is from 95:5 to 50:50, and optionally additional additives, characterized in that the amine is present in a form having a blocked or decreased reactivity which can be reactivated without reacting it with a chemical participant of reaction. Further, it is directed to amine modified thermosetting materials containing triazine groups as well as to a method for preparing same.

18 Claims, 2 Drawing Sheets

QUICK-SETTING MIXTURES AND KITS WITH POLYFUNCTIONAL CYANATES AND AMINES, THE THERMOSETS PRODUCED THEREFROM AND METHODS FOR THE PRODUCTION THEREOF

FIELD OF THE INVENTION

This invention is directed to fast curable polymers of polycyanates and polycyanate/epoxide combinations together with amine curing agents. These polymers are widely useful, specifically as laminating resins, adhesives, casting resins, underfillers, masking or encapsulating agents, coating agents. They have a high thermostability, they are fire-retardant, and their pot life and processing temperature is controllable in broad ranges.

DESCRIPTION OF THE RELATED ART

Thermosetting materials made of polycyanates (polyfunctional cyanic acid esters of the general formula $R(OCN)_n$) are increasingly used, specifically as laminating resins and adhesives in the high-tech area (for a review see e.g. "Chemistry and Technology of Cyanate Ester Resins", I. Hamerton (ed.), Chapman & Hall, Glasgow, 1994). They are specifically characterized by high glass transition temperatures and decomposition temperatures, flame-resistance even without the addition of nonflammable additives, high viscosity compared to other thermosets having high glass transition temperatures, low dielectric losses, good adhesion to a multiplicity of substrate materials, high chemical resistance and a low corrosiveness.

The curing reaction of polycyanates (polycyclotrimerization to polycyanurates) is rather slow in case very pure monomers are used. Impurities resulting from the monomer synthesis, e.g. unreacted phenols or water, catalyze the curing reaction, but in an undefined and uncontrollable way. For this reason, very pure monomers are used, some of which are commercially available, e.g. AroCy B-10 based on Bisphenol A of Lonza AG, Schweiz. To accelerate the curing reaction and consequently to obtain more efficient methods for the manufacture of polycyanates, a variety of catalysts is used. For this purpose, especially metal acetylacetonates, zinc salts, a variety of organometallic compounds as well as phenols, and compounds containing NH radicals have successfully been used.

As known since the sixties, primary and secondary amines easily react with cyanates (see e.g. Grigat, E. et al., Angew. Chem. 79, 219 (1967)). Consequently, it has been attempted to use amines as catalysts for the cyclotrimerization of cyanates. As a result, however, the reactivity of the mixture is too high and the processing is not under control, especially when aliphatic amines are used, e.g. common epoxide curing agents. Thus, the dicyanate AroCy® L-10 (Lonza AG) which is liquid at room temperature, abruptly turns into a gelled condition immediately as soon as a low amount of diaminohexane is admixed thereto. In contrast, by use of solid amine powder in combination with other solid catalysts (0.1–1.5 wt.-%), the formulation of a cyanate/epoxy system useful as an underfiller (U.S. Pat. No. 5,855,821) is obtained, wherein the amine is not catalytically active until an increased curing temperature is reached.

If molar amounts of an amine are used which exceed 1 mol-%, relative to the cyanate radicals, it cannot be said that the action is merely catalytic. Instead, a co-reaction between cyanate and amine occurs by which the amount of the cyanaruate structures obtained solely from the cyanates drastically decreases. This reaction has already been used for the production of curable polyaddition products (see e.g. DE 12 20 132). In this case, solutions of the amine and the cyanate were mixed, the polyadduct was separated in substance, and this mass was cured at an elevated temperature. Use of bifunctional educts yielded linear products which were linked by isourea ether groups. If trifunctional or multifunctional amines and/or trifunctional and multifunctional cyanates are solely used or used in addition, respective cross-linked plastics should be obtained.

Pre-produced polymer adducts of cyanates and amines are also useful for the production of thermoresistant thermosets, if they are mixed with other reactive resins, e.g. maleimides (U.S. Pat. Nos. 4,499,245, 4,370,467), cyclopentadienes (U.S. Pat. No. 4,469,859), polyhydantoins (U.S. Pat. No. 4,410,666), polyisocyanates (U.S. Pat. No. 4,369,302), epoxies (U.S. Pat. No. 4,393,195, EP 0,369,527) und others.

Since the presence of a larger amount of amine in a mixture of a cyanate and an amine should necessarily result in an uncontrollable production of acyclic or cross-linked polycyanates, the co-polymerization of a larger amount of an amine with a polyfunctional cyanate does not seem a possible route in order to arrive at the production of modified polycyanurates.

BRIEF SUMMARY OF THE INVENTION

It is an object of the present invention to provide resin systems made of polyfunctional cyanates or mixtures of cyanates and epoxides together with amines which may be reacted to thermosetting polycyanate copolymers having a high proportion of triazine structures, as well as to provide thermosetting plastics thus obtained. Further, it is an object of the present invention to provide resin systems from which the said thermosetting polycyanates may be obtained by applying short curing times and in high reproducibility.

DETAILED DESCRIPTION OF THE PREFERRED EMBODIMENTS

Figure 1:
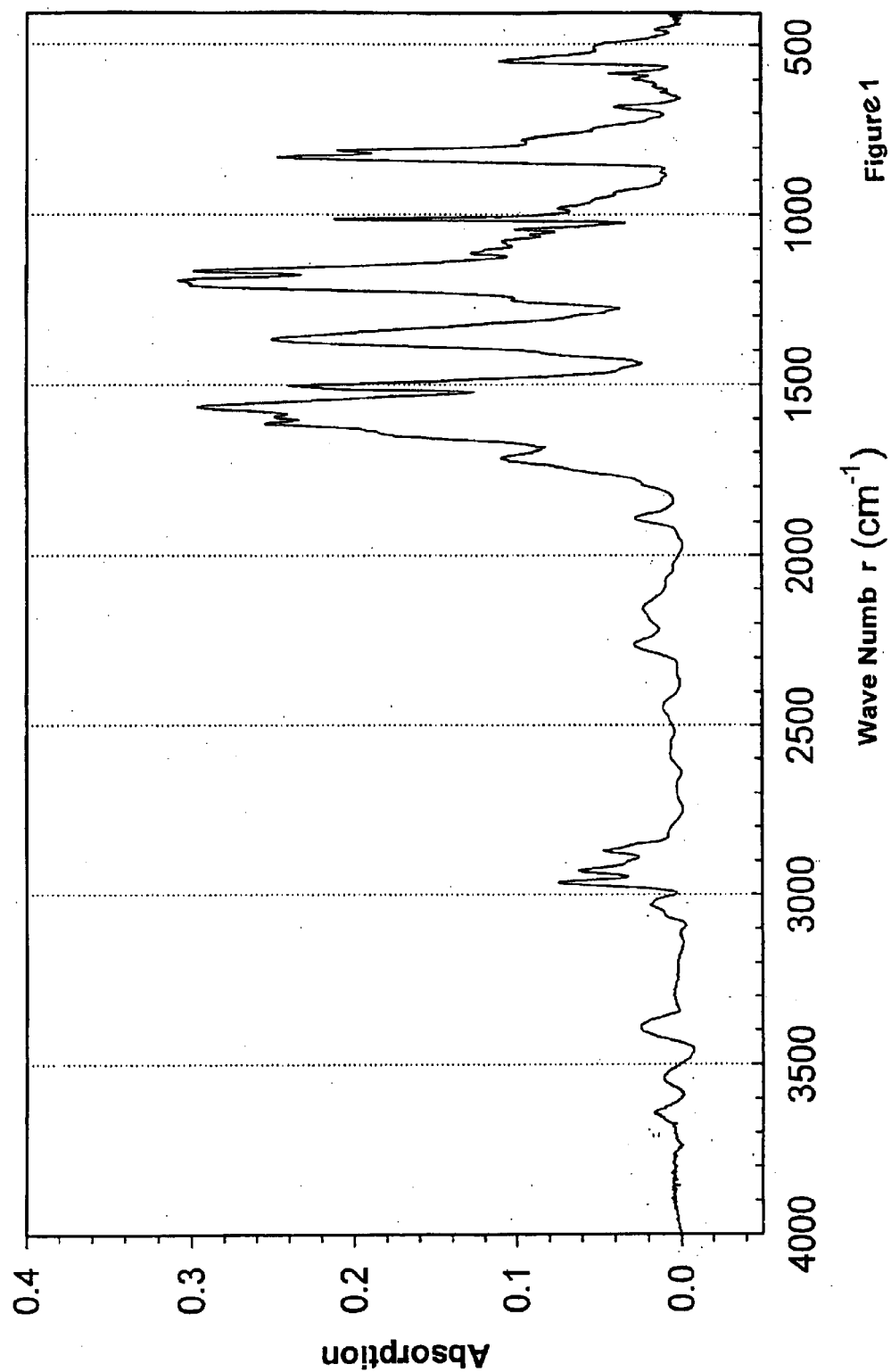
FIG. 1 shows an IR spectrum in an embodiment according to the present invention.

It has been found that combinations of cyanates or mixtures of cyanates and epoxides, respectively, and amines may be formulated which allow for a controllable curing without the necessity of a previous prepolymerization. In this formulations, molar ratios of amino radicals of from about 5 to about 50 mol-% may be used, relating to the sum of the amino and the cyanate radicals present in the mixture, which allows for a wide variety of gelling and curing times. This is obtained by the addition of primary or secondary amines the reactivity of which is blocked or decreased, and especially which are chemically or physically encapsulated, to the cyanates or mixtures of cyanates and epoxides, respectively. After liberation of the amine, e.g. by melting it at increased temperatures, by removing sheath or coatings, by the action of pressure or of supersonic waves or of other energy types, the curing reaction of the resins starts. Curing times may be between a few seconds and some hours, depending on the composition of the resin, the reactivity of the amine and the curing temperature. The glass transition temperatures of the cured thermosets may vary in relation to the structure of the basic cyanate/epoxide resins used and often are between 120° C. and 350° C. High glass transition temperatures are specifically obtained in case novolak cyanates or novolak epoxides are used. Very short curing times are attained when primary alkyl amines are used.

The cyanates to be used according to the invention may be polyfunctional cyanates, and preferably those having the following structures I–IV:

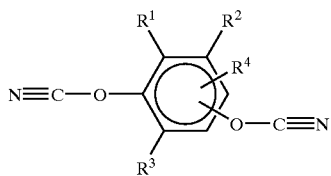

wherein $R^1$ to $R^4$ are independently from each other hydrogen, $C_1$–$C_{10}$alkyl, $C_3$–$C_8$ cycloalkyl, $C_1$–$C_{10}$ alkoxy, halogen, phenyl or phenoxy, the alkyl or aryl groups optionally being partly or fully fluorinated. Examples are phenylene-1,3-dicyanate, phenylene-1,4-dicyanate, 2,4,5-trifluorophenylene-1,3-dicyanate;

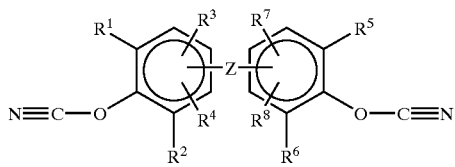

wherein $R^5$ to $R^8$ are as $R^1$ bis $R^4$ and Z is a chemical bond, $SO_2$, $CF_2$, $CH_2$, CHF, $CH(CH_3)$, isopropyl, hexafluoroisopropyl, $C_1$–$C_{10}$ alkyl, O, $NR^9$, N═N, CH═CH, COO, CH═N, CH═N—N═CH, alkyloxyalkyl having a $C_1$–$C_8$ alkyl group, S, $Si(CH_3)_2$ or

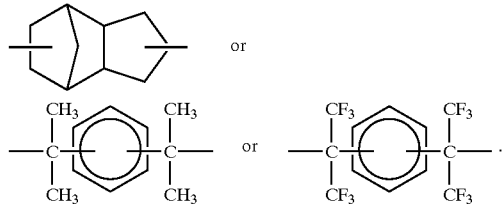

Examples are 2,2-bis(4-cyanato-phenyl)propane, 2,2-bis(4-cyanato-phenyl)hexafluoropropane, biphenylene4,4'-dicyanate;

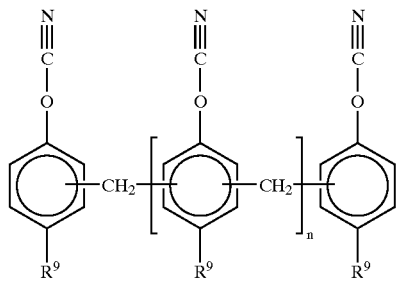

wherein $R^9$ is hydrogen or $C_1$–$C_{10}$ alkyl and n is an integer from 0 to 20, as well as

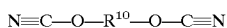

wherein $R^{10}$ is a two-binding organic non-aromatic hydrocarbon having at least one fluorine atom and preferably 3 to 12 carbon atoms. The said cyanates may be used as monomers or prepolymers, alone or in mixture with each other or in mixture with other monofunctional or polyfunctional cyanates.

The properties of the polycyanurate resins obtainable therefrom, and especially the glass transition temperatures, may be manipulated e.g. by way of copolymerization of the polyfunctional cyanates and/or their prepolymers with monocyanates having the structures V or VI, wherein $R^1$ to $R^5$ and $R^{10}$ are as previously defined, the amount of cyanate radicals of monofunctional cyanates being up to 50 mol-%, in relation to all cyanate radicals of the mixture.

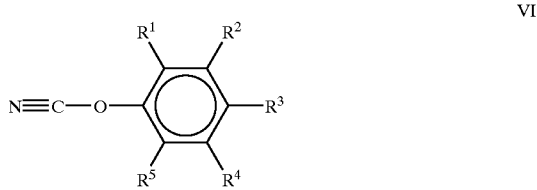

To the mixtures, monofunctional or polyfunctional glycidyl ethers may be added in amounts up to 75 mol-%, preferably up to 50 mol-%, in relation to the sum of the glycicyl and cyanate radicals.

Glycidyl ethers to be used may have the following basic structure:

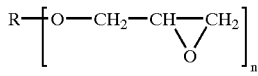

wherein R is any aromatic, aliphatic or cycloaliphatic radical and n is from 1 to 20. Examples are phenyl glycidyl ether, 2,2-bis(4-glycidyloxy-phenyl)propane, bis(glycidyloxy) tetramethyldisiloxane or novolak cyanates having the structure III, wherein OCN is replaced by a glycidyl ether group —$OCH_2(CHCH_2O)$. The glycidyl ethers may be used as pure substances or as prepolymers.

For solvent-free resin systems, liquid cyanates, e.g. AroCy® L-10 (Lonza AG), or liquid mixtures of AroCy® L-10 in combination with other cyanates or the prepolymers thereof, or liquid mixtures of cyanates and glycidyl ethers, e.g. Rütapox (Bakelite AG), may be used. Alternatively, solvents may be used, for example those which dissolve the cyanates or the cyanate epoxide combinations, respectively, but do not dissolve the amine the reactivity of which is blocked or decreased. Useful solvents for such cases are e.g. acetone, dichloromethane, tetrahydrofuran, diethyleneglycol dimethyl or diethyl ether, diethyleneglycol monobutyl ether acetate.

The definition "primary or secondary amines which show blocked or decreased reactivity and especially ones which are chemically or physically encapsulated" shall mean those amines which due to a chemical or physical blocking are incapable or only have very low capability to react with cyanate which is present in the same mixture, but may regenerate their reactivity without reacting with a chemical reactant which would cleave a protective group. These properties may be inherent to the amines due to physical or chemical conditions. Particularly suitable are primary or secondary amines the restoration of reactivity of which is merely performed by increasing the temperature at a time as desired. For these cases, it is specifically preferred to use amines in particulate shape which are solid and undissolved or undissolvable at the storage conditions of the components or the mixture thereof. Upon heating, the amine will melt, thereby regenerating the reactivity immediately, either by reactions at the grain boundaries or in solution. In another embodiment, finely suspended particles of the amine or the amine mixture are encapsulated, i.e. coated with a protective layer or sheath, so that no free amino radicals are available to the functional groups of the resin and in turn no curing reaction may take place before the protective sheath is disrupted. The sheath or layer will melt or break only upon increased temperature, thereby releasing the previously coated amine. This protective sheath may protect solid amines, but in some cases also semisolid or liquid ones, for example if it has the shape of coatings (e.g. made of wax) or of vesicles the membrane of which is unstable at raised temperatures.

In another embodiment of the invention, the amines are chemically modified. It is specifically preferred that only the outer shell of solid amine particles is treated. This is performed by adding a protective group to those amine radicals which are in contact with the outer environment. This chemical modification may but need not necessarily be reversed without a chemical reactant. This is especially the case in the preferred embodiment, because only a small part of the amine, depending of the particle size, e.g. about 10% of the amine, is inactivated by the modification. This amount may then be compensated by adding an increased amount of amine, if necessary. Such a modification may especially be attained by suspending a solid amine or amine mixture in an e.g. nonpolar solvent and reacting the amino radicals present on the surface of the particles e.g. with isocyanates and/or chlorosilanes. Amines thus encapsulated are not dissolvable in the resin at low temperatures, and no reactions take place. Upon raising the temperature up to the melting range of the amine or the encapsulating layer, respectively, the sheath or capsule will disintegrate, presenting the previously inward amine, and the curing reaction of the resin will start. The starting temperature may be controlled by the melting range, and the curing time may be controlled by the reactivity of the amine.

The size of the amine particles to be used may be chosen as desired. Preferably, the particles have a diameter of from about 1 to 100 $\mu$m, more preferably of <20 $\mu$m.

The reactivity of the amines may be restored not only by applying heat as mentioned before, but also by other measurements like change of pressure, sonification, irradiation or the like. The amount of energie introduced therewith (e.g. by means of strong mechanical vibrations, e.g. by ultrasound, or by strong shearing forces, e.g. in a mixing apparatus) may result in breaking up the capsule. After releasing, the amines can for example dissolve in the resin without melting, whereupon the reaction is started. Radiation which is rich of energy, or the like may optionally be used in order to break a chemical bonding which in turn yields a free amino radical.

The selection of the amines as such is not critical. If solid amine particles are used which are to melt, it may be performed considering the melting point of the amine which in turn should correspond to the temperature at which the resin is to be cured. The selection of the number of amino groups per molecule is made in the light of the desired properties of the thermosetting material to be prepared, which is within the knowledge of a skilled person. Likewise, primary and/or secondary amines as well as additional properties are selected. For example, alkyl amines, which in principle should be acceptable, might be considered as not useful because they might have too high a reactivity and/or too low a melting point (often they are "waxy" which makes encapsulation thereof difficult). As examples for amines which may successfully be used, 1,2-diaminobenzene, 1,3-diaminobenzene, 4,4'-diaminodiphenylsulphone, 4,4'-diaminodiphenylmethane, piperazine, 1,4-diaminocyclohexane, α,α'-diamino-p-xylene, or amines having a structural relationship with these substances, are mentioned.

The ratio between the amount of the cyanate and that of the amine is also not critical and will preferably be in the range of 95:5 to 50:50, relative to the number of the cyanate and amino groups present.

The polyfunctional cyanates and the prepolymers or mixtures thereof to be used according to this invention, and the amines useful in the invention, may optionally be stored separately until it is intended to prepare the thermosetting material. However, due to the specific properties of the used amines, it is specifically possible to prepare mixtures with a long shelf life into which the required amount of amine has already been incorporated. The expression "having a long shelf life" shall mean a mixture which may be stored at least one or two days, but in many instances as long as some weeks or months, without polymerization taking place which in turn would substantially affect the result of the later preparation of the thermosetting material.

One-component-systems as well as two-component-systems having pot lifes (so called "pot times" at room temperature) of a few days up to some months may be formulated. As soon as the preparation of the thermoset is desired, the required heat or energy is incorporated into the mixture of the components, whereupon spontaneous curing occurs which has been finalized after about 1 s and some hours, depending on the reactivity of the components selected.

The thermosetting materials thus obtained include one ore more of the following structural elements:

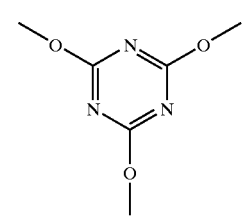

A

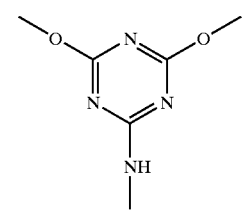

B

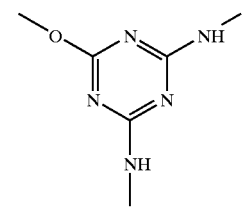

C

-continued

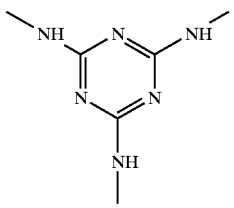

wherein an increasing amount of amine yields the predominant formation of structures C and D. If 20 mol-% amine groups or more are contained, cyanurate structure A can almost not be detected.

In order to formulate adhesives, underfillers, coatings (lacquer, paint) and the like, the resin having the composition as detailed above may be compounded with additives which are generally employed for a respective use, e.g. thixotroping agents, fillers, dyes, conductivity enhancing agents, tougheners, and the like.

The invention shall further be illustrated by the following examples:

EXAMPLE 1

39.6 g of bis-(4-aminophenyl)methane are finely ground in a mill (particle size <20 μm), and the powder thus obtained is suspended in 500 ml cyclohexane at 60° C. with vigorous stirring. 17 ml of 1,6-diisocyanatohexane are dissolved in 40 ml cyclohexane, and the solution thus obtained is added dropwise to the amine containing suspension. After 30 min, the suspension is filtered and the filtrate is washed with cyclohexane and dried. 40 g of a white powder are obtained. To 9 g AroCy® L-10 (Lonza AG), compound II with $R^1$–$R^8$=H, Z=phenylmethyl, 1 g of the encapsulated amine is added, and the mixture is stirred well. A stable opaque suspension forms. After one week at room temperature, the viscosity of the resin is increased by not more than 10%. The gelling times of the mixture are 1 s at 150° C. and 10 s at 100° C. After 2 min at 150° C., curing of the resin is terminated. The thermosetting material thus obtained has a glass transition temperature of 218° C.

EXAMPLE 2

26 g of 1,4-diaminobenzene are finely ground in a mill (particle size <20 μm), and the powder thus obtained is suspended in 320 ml cyclohexane at 70° C. with vigorous stirring. 11.6 ml 1,6-diisocyanatohexane are dissolved in 65 ml cyclohexane, and the solution thus obtained is added dropwise to the amine containing suspension. After 10 min, the suspension is filtered and the filtrate is washed with cyclohexane and dried. 31.3 g of a pale violet powder are obtained. To a mixture of 6.3 g AroCy® L-10 (Lonza AG), compound II with $R^1$–$R^8$=H, Z=phenylmethyl, and 2.7 g R ūtapox 0164 (Bakelite AG), 1 g of the encapsulated amine is added, and the mixture is stirred well. A stable opaque suspension forms. After three weeks at room temperature, the viscosity of the resin is increased by not more than 6%. The gelling times of the mixture are 30 s at 150° C. and 100 s at 120° C. After 4 min at 150° C., curing of the resin is terminated. The thermosetting material thus obtained has a glass transition temperature of 187° C.

EXAMPLE 3

26 g of 1,4-diaminobenzene are finely ground in a mill (particle size <20 μm), and the powder thus obtained is suspended in 320 ml cyclohexane at 70° C. with vigorous stirring. 11.6 ml 1,6-diisocyanatohexane are dissolved in 65 ml cyclohexane, and the solution thus obtained is added dropwise to the amine containing suspension. After 10 min, the suspension is filtered and the filtrate is washed with cyclohexane and dried. 31.3 g of a pale violet powder are obtained. To a mixture of 6 g prepolymer of AroCy® B-10 (Lonza AG), compound II with $R^1$–$R^8$=H, Z=isopropyl, degree of conversion of cyanate radicals 32%, and 3 g butanediol diglycidyl ether, 1.5 g of the encapsulated amine are added, and the mixture is stirred well. A stable opaque suspension forms. After three weeks at room temperature, the viscosity of the resin is increased by not more than 4%. The gelling times of the mixture are 15 s at 150° C. and 50 s at 120° C. After 3 min at 150° C., curing of the resin is terminated. The thermosetting material thus obtained has a glass transition temperature of 164° C.

EXAMPLE 4

24 g of 1,4-diaminobenzene are finely ground in a mill (particle size <20 μm), and the powder thus obtained is suspended in 470 ml cyclohexane at 70° C. with vigorous stirring. 13.9 ml isophorone diisocyanate are dissolved in 70 ml cyclohexane, and this solution is added dropwise to the amine containing suspension. After 10 min, the suspension is filtered and the filtrate is washed with cyclohexane. The powder thus obtained is suspended in 250 ml toluene and 20.5 ml triethylamine at 25° C. with vigorous stirring. 18.9 ml trimethyl chlorosilane are dissolved in 30 ml toluene, and this solution is added dropwise to the said suspension. After 60 min, the suspension is filtered and the filtrate is washed with toluene and dried. 25.2 g of a pale violet powder are obtained. To a mixture of 6.3 g AroCy® PT-15 (Lonza AG), compound III with $R^9$=H, and 2.7 g butanediol diglycidyl ether, 1.2 g of the encapsulated amine are added, and the mixture is stirred well. A stable opaque suspension forms. After two months at room temperature, the viscosity of the resin is increased by not more than 5%. The gelling times of the mixture are 10 s at 150° C. and 25 s at 120° C. After 3 min at 150 C., curing of the resin is terminated. The thermosetting thus obtained has a glass transition temperature of 201° C. Attached FIG. 1 shows the IR spectrum of a thermoset prepared in the same way, except that the curing time was 5 minutes at 150° C.

EXAMPLE 5

17.1 g of 1,4diaminocyclohexane are finely ground in a mill (particle size <20 μm), and the powder thus obtained is suspended in 400 ml cyclohexane at 25° C. with vigorous stirring. 6.3 ml isophorone diisocyanate is dissolved in 50 ml cyclohexane, and this solution is added dropwise to the amine containing suspension. After 15 min, the suspension is filtered and the filtrate is washed with cyclohexane. The powder thus obtained is suspended in 200 ml toluene and 13.7 ml triethylamine at 25° C. with vigorous stirring. 12.6 ml trimethyl chlorosilane are dissolved in 30 ml toluene, and the solution is added dropwise to the said suspension. After 30 min, the suspension is filtered and the filtrate is washed with toluene and dried. 19.8 g of a pale yellow powder are obtained. To a mixture of 5 g AroCy® L-10 (Lonza AG), compound II with $R^1$–$R^8$=H, Z=isopropyl, and 4 g trimethylolpropane triglycidylether, 1.1 g of the encapsulated amine are added, and the mixture is stirred well. A stable opaque suspension forms. After two months at room temperature, the viscosity of the resin is increased by not more than 5%. The gelling times of the mixture are 1 s at 150° C. and 20 s at 80° C. After 60 s at 150 C., or after 5 min at 80° C., respectively, curing of the resin is terminated. The thermosetting thus obtained has a glass transition temperature of 170° C.

Comparative Example 1

Example 4 was repeated, except that 1,4-diaminobenzene without prior encapsulation was mixed with the resin.

Figure 2:
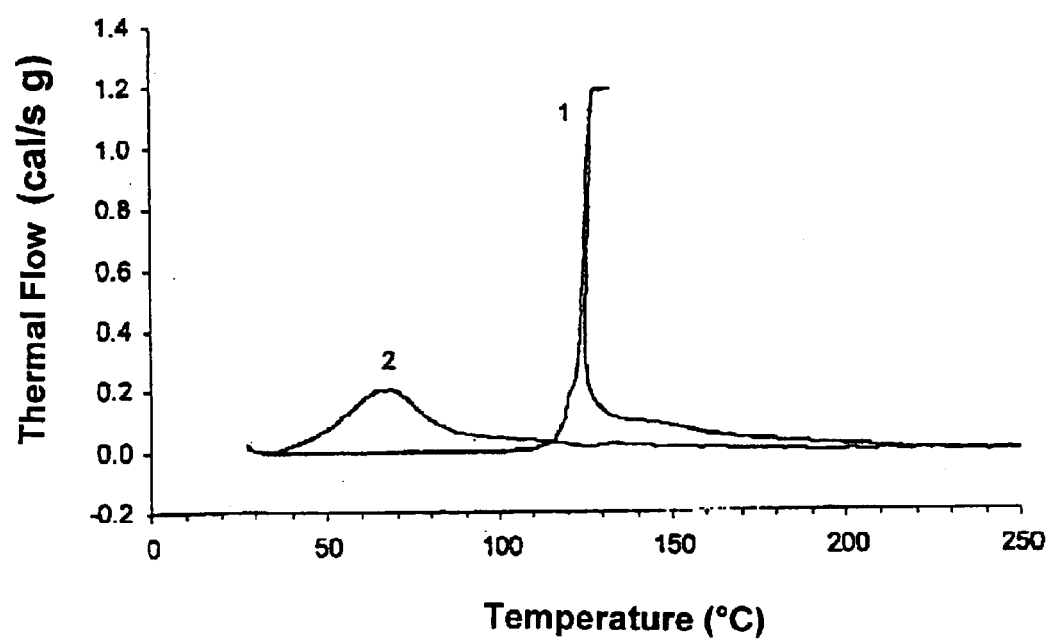
FIG. 2 shows a differential thermogram in an embodiment according to the present invention.

FIG. 2 shows the differential thermogram of the curings of a mixture according to example 4 (graph 1) and a mixture according to comparative example 1 (graph 2). The mixture according to example 4 shows no substantial curing reaction up to about 100° C. At about 120° C., the reaction almost suddenly starts and is terminated at a temperature of about 170° C. at the selected heating rate of 5 K/min. In contrast, curing of the mixture according to comparative example 1 already starts at the beginning of the measurement at 27° C. and is almost complete until a temperature of about 120° C. is reached.

We claim:

1. Fast curable system for the preparation of amine modified thermosetting materials containing triazine radicals, comprising:

a) at least one polyfunctional organic monomeric or prepolymerized cyanate and
   b) at least one primary or secondary amine, wherein the amount of amine is selected such that the molar ratio of cyanate to amine radicals is 95:5 to 50:50, characterized in that the amine present has a blocked or decreased reactivity which can be reactivated without reacting it with a chemical participant of reaction.

2. Fast curable system according to claim 1, wherein the polyfuctional organic cyanate is selected among cyanates having formulae I to IV:

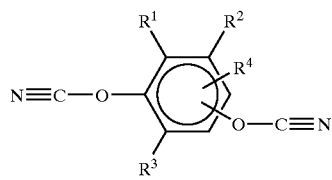

I wherein $R^1$ to $R^4$ are independently from each other hydrogen, $C_1$–$C_{10}$ alkyl, $C_3$–$C_8$ cycloalkyl, $C_1$–$C_{10}$ alkoxy, halogen, phenyl or phenoxy,

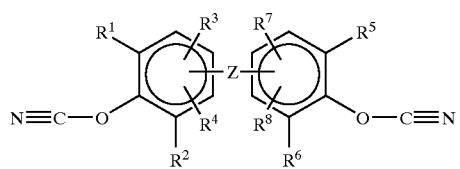

II wherein $R^5$ to $R^8$ are as $R^1$ to $R^4$ and Z is a chemical bond, $SO_2$, $CF_2$, $CH_2$, $CHF$, $CH(CH_3)$, isopropyl, hexafluoroisopropyl, $C_1$–$C_{10}$ alkyl O, $NR^9$, $N=N$, $CH=CH$, COO, $CH=N$, $CH=N-N=CH$, alkyl oxyalkyl containing $C_1$–$C_8$-Alkyl, S, $Si(CH_3)_2$,

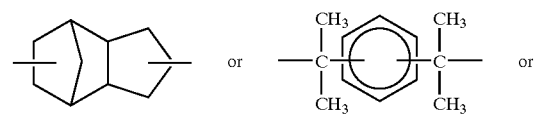

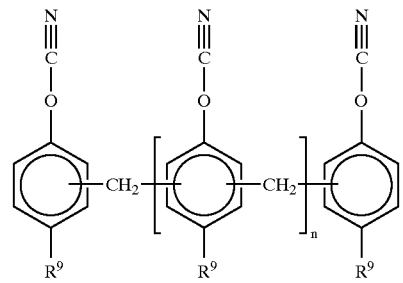

III wherein $R^9$ is hydrogen or $C_1$–$C_{10}$ alkyl and n is an integer of from 0 to 20, $$N\equiv C-O-R^{10}-O-C\equiv N \qquad IV$$

wherein $R^{10}$ is a two-binding organic non-aromatic hydrocarbon having at least one fluorine as well as among prepolymers of the said cyanates.

3. Fast curable system according to claim 2, wherein the cyanates having structure I are selected among phenylene-1,3-dicyanate, phenylene-1,4-dicyanate and 2,4,5-trifluorophenylene-1,3-dicyanate.

4. Fast curable system according to claim 1, wherein the system additionally contains at least one monofunctional cyanate selected from those of structure V and VI

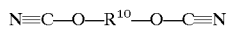

V

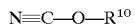

VI

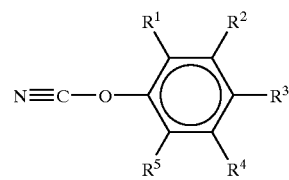

and of prepolymers thereof and of prepolymers containing at least one cyanate of formulae V or VI.

5. Fast curable system according to claim 1, wherein the system additionally contains at least one mono- or polyfunctional glycidyl ether in an amount of up to 7.5 mol-%, glycidyl radicals, in relation to the sum of glycidyl radicals and cyanate radicals.

6. Fast curable system according to claim 5, wherein the mono- or polyfunctional glycidyl ethers are selected among those of the following formula:

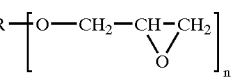

wherein R is any aromatic, aliphatic or cycloaliphatic radical, and n is an integer of 1 to 20.

7. Fast curable system according to claim 5, wherein the glycidyl ethers are selected from the group consisting of phenyl glycidyl ether, 2,2-bis(4glycidyloxy-phenyl) propane, bis(glycidyloxy)tetramethyldisiloxane and novolak cyanates of structure III wherein OCN has been replaced by a glycidylether residue —OCH$_2$(CHCH$_2$O).

8. Fast curable system according to claim 1, wherein the amine is in the shape of solid particles which are insoluble in their environment and have a diameter of from 1 to 100 μm.

9. Fast curable system according to claim 5, wherein the amine particles are chemically inert at their outer surface.

10. Fast curable system according to claim 9, wherein the outer surface of the amine particles has been reacted with isocyanates and/or chlorosilanes.

11. Method for preparing amine modified thermosetting materials containing triazine groups, wherein at least one polyfunctional organic monomeric or prepolymerized cyanate and at least one of primary and secondary amines are mixed and reacted, and the amount of amine is selected such that the molar ratio of cyanate radicals to amine radicals is from 95:5 to 50:50, wherein the cyanate is mixed with the amine while the amine has a blocked or decreased reactivity which can be reactivated without reacting it with a chemical participant of reaction, and subsequently the amine is reactivated.

12. Method according to claim 11, wherein at least one selected from monofunctional cyanates and glycidyl ethers is additionally mixed with the cyanate.

13. Fast curable system according to claim 1, comprising additional additives.

14. Fast curable system according to claim 2, wherein the alkyl or aryl radicals R$^1$ to R$^4$ in the cyanates of formula I are fluorinated.

15. Fast curable system according to claim 2, wherein R$^{10}$ of the cyanates of formula IV is a two-binding organic non-aromatic hydrocarbon having at least one fluorine atom and 3 to 12 carbon atoms.

16. Fast curable system according to claim 2, wherein the cyanates of formula II are selected from 2,2-bis(4-cyanato-phenyl)propane, 2,2-bis(4-cyanato-phenyl)hexafluoropropane and biphenylene-4,4'-dicyanate.

17. Fast curable system according to claim 1, wherein the system additionally contains at least one mono- or polyfunctional glycidyl ether in an amount up to 50 mol-% glycidyl radicals, in relation to the sum of glycidyl radicals and cyanate radicals.

18. Fast curable system according to claim 8, wherein the amine is in the shape of solid particles which are insoluble in their environment and have an average diameter of <20 μm.

* * * * *